(12) United States Patent
Archdeacon et al.

(10) Patent No.: US 8,862,830 B2
(45) Date of Patent: Oct. 14, 2014

(54) CACHING DATA OBJECTS ON A CLIENT SIDE USING A PROTOTYPE CHAIN

(75) Inventors: Philip A. Archdeacon, Ottawa (CA); Chris Perkins, Ottawa (CA); Xuebing Qing, Ottawa (CA); Sabrina Tang, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 13/399,859

(22) Filed: Feb. 17, 2012

(65) Prior Publication Data

US 2013/0219127 A1 Aug. 22, 2013

(51) Int. Cl.
*G06F 12/08* (2006.01)

(52) U.S. Cl.
CPC ...................................... *G06F 12/08* (2013.01)
USPC ..................... 711/144; 711/145; 711/E12.041

(58) Field of Classification Search
CPC ........................................................ G06F 12/08
USPC ................... 711/144, 145, E12.001, E12.041
See application file for complete search history.

(56) References Cited

U.S. PATENT DOCUMENTS

| | | | |
|---|---|---|---|
| 6,615,253 B1 | 9/2003 | Bowman-Amuah | |
| 7,266,657 B2 * | 9/2007 | Leung | 711/162 |
| 7,603,677 B2 | 10/2009 | Mukundan et al. | |
| 7,698,256 B1 | 4/2010 | Wang | |
| 8,469,278 B2 * | 6/2013 | Tomoeda | 235/492 |
| 2005/0053283 A1 * | 3/2005 | Wakeam et al. | 382/186 |
| 2009/0049423 A1 | 2/2009 | Yao et al. | |
| 2010/0011341 A1 | 1/2010 | Baierl et al. | |
| 2010/0191805 A1 | 7/2010 | Lu et al. | |
| 2011/0283077 A1 * | 11/2011 | Cammarata et al. | 711/170 |

OTHER PUBLICATIONS

Codeproject, "Generic Cache Manager", [online], Last Updated Feb. 3, 2007, retrieved from the Internet at <URL: http://www.codeproject.com/KB/web-cache/Generic_Cache_Manager.aspx?display=Mobile>, 3 pp.
Datta, A., K. Dutta, H. Thomas, and D. Vandermeer, "A Comparative Study of Alternative Middle Tier Caching Solutions to Support Dynamic Web Content Acceleration", Proceedings of the 27th VLDB Conference, 2001, 4 pp.
Oracle, "Deploying Web 2.0 Applications on Oracle Servers and the OpenSolaris Operating System", An Oracle White Paper, Apr. 2010, 18 pp.
Wikipedia, "ECMAScript", [online], Last Modified Feb. 15, 2012, [Retrieved on Feb. 16, 2012], retrieved from the Internet at <URL: http://en.wikipedia.org/wiki/ECMAScript>, 10 pp.
Wikipedia, "Category: Prototype-Based Programming Languages", [online], Last Modified Jan. 5, 2011, [Retrieved on Feb. 16, 2012], retrieved from the Internet at <URL: http://en.wikipedia.org/wiki/Category:Prototype-based_programming_languages>, 2 pp.

* cited by examiner

*Primary Examiner* — Pierre-Michel Bataille
(74) *Attorney, Agent, or Firm* — Janaki K. Davda; Konrad, Raynes, Davda and Victor LLP

(57) ABSTRACT

Provided are a computer implemented method, computer program product, and system for caching a data object. A copy of an original data object to a specified depth is obtained. The copy of the original data object to the specified depth is cached with reference to the original data object in a prototype chain. A change to a value of a property of the cached copy is received. A new property entry is created for the changed value of the property under the cached copy. A change flag is set to indicate that there is a changed value for the property.

15 Claims, 5 Drawing Sheets

US 8,862,830 B2

CACHING DATA OBJECTS ON A CLIENT SIDE USING A PROTOTYPE CHAIN

FIELD

Embodiments of the invention relate to caching data objects on a client side in a client-server environment.

BACKGROUND

A web 2.0 application may be described as one that enables users to share information and collaborate on the World Wide Web (WWW) through a social media dialogue by creating/updating data objects. The social media dialogue may take place via social networking sites, blogs, wikis, video sharing sites, hosted services, web applications, mashups, folksonomies, etc.

In a web 2.0 application, a user may obtain a copy of a data object, and it is common for a user change to the copy of the data object through a User Interface (UI) or a widget does not apply the user change to the underneath data object (i.e., the original data object) until the user explicitly instructs the UI or widget to apply the user change. This allows for a more interactive environment.

For instance, in a dialogue or a similar widget, changes that a user has made to copies of data objects are not applied to original data objects that the dialogue operates on until the user clicks an "OK" button. A caching mechanism allows the temporary changes to be cached or stored somewhere in the memory, and the changes are applied to the data objects only when the user wants to do so.

Some conventional systems embed the caching logic directly in individual widgets that operate on specific data objects or have a centralized caching mechanism that depends on extensive copying or cloning.

SUMMARY

Provided are a computer implemented method, computer program product, and system for caching a data object. A copy of an original data object to a specified depth is obtained. The copy of the original data object to the specified depth is cached with reference to the original data object in a prototype chain. A change to a value of a property of the cached copy is received. A new property entry is created for the changed value of the property under the cached copy. A change flag is set to indicate that there is a changed value for the property.

BRIEF DESCRIPTION OF THE SEVERAL VIEWS OF THE DRAWINGS

In the drawings, like reference numbers represent corresponding parts throughout.

FIG. 3 is formed by FIGS. 3A and 3B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
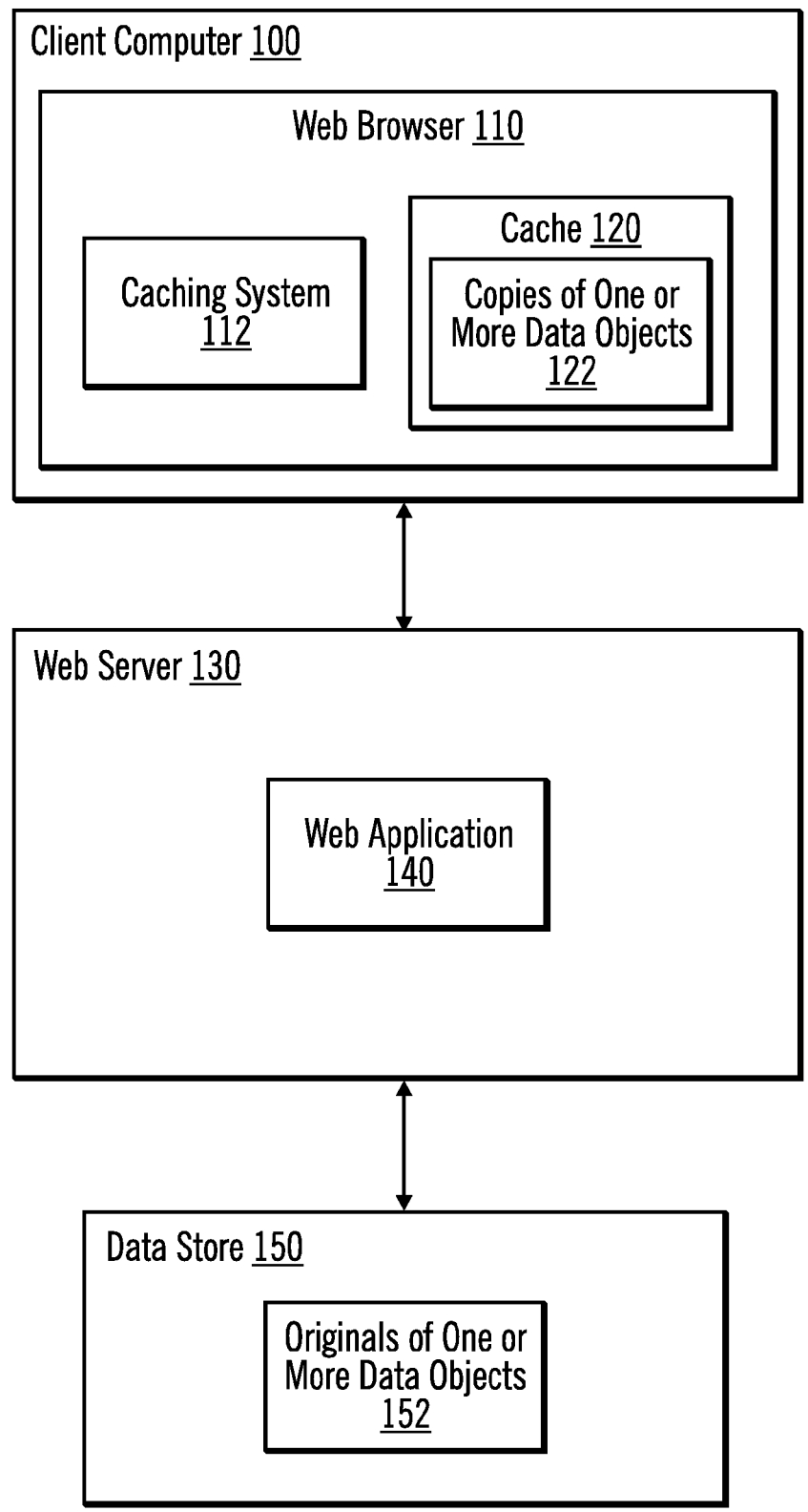
FIG. 1 illustrates, in a block diagram, a client-server environment in accordance with certain embodiments.

FIG. 1 illustrates, in a block diagram, a client-server environment in accordance with certain embodiments. In FIG. 1, a client computer 100 is coupled to a web server 130. The web server 130 includes a web application 140. The web server 130 is coupled to a data store 150. The data store 150 includes originals of one or more data objects 152. A data object may have a hierarchy in which there is a root data object and child data objects. A depth of the data object represents a level of the data object hierarchy.

The client computer 100 includes a web browser 110. In particular, the web application 140 executes on the web server 130 to provide copies of the original data objects 152 to the web browser 110 executing on the client computer 100. The web browser 110 is a type of runtime environment. The web browser 110 includes a caching system 112 that stores the copies of the data objects 122 in the cache 120.

Embodiments cache data objects based on prototype chaining in a runtime environment, such as a web browser (also referred to as an internet browser) or any other host for the runtime environment.

A prototype chain (also referred to as a prototype inheritance chain) describes an inheritance relationship between data objects. In some languages (e.g., the JavaScript® language), a data object 152 is connected to another data object 152 through a built-in property called a prototype. (JavaScript is a trademark or registered trademark of Oracle and/or its affiliates in the United States and/or other countries.) That is, a first data object is prototype-chained to a second data object. When retrieving the value (v) for a given property (k) under a data object, a runtime environment (e.g., a JavaScript® runtime environment) looks up the value for "k" from the data object itself first; if not found, the runtime environment goes up along the prototype chain until either finding the value for "k" or reaching the root of the prototype chain.

As an example, data object A is a copy of original data object B, and data object A refers to data object B as its prototype. Because data object A refers to data object B as its prototype, any property that is accessible through data object B (i.e., B.pbi) may be accessed through data object A due to prototype chaining (i.e., A.pbi and B.pbi point to the same property entity). However, when a new value is assigned to A.pbi, the caching system 112 creates a new property entity in the prototype chain for data object A to hold the new value, while B.pbi still has the old value. To apply the new value from data object A to the original data object B or to submit the change to the original data object B, the caching system 112 executes a submit function to apply A.pbi to B.pbi if the property value is changed. In certain embodiments, the submit function is a generic function that may be used in different runtime environments.

Merely to enhance understanding, one variant of the caching system 112 is presented using an example. In the example, a data object B has properties bx, by, bz, where bx, by, bz may be of any valid type or data object. Some valid types/data objects include, but are not limited to, date, string, Boolean, array, custom-defined data objects, etc. In this example, assume bx is a custom-defined data object, and bx has its own properties xx, xy, xz. In this example, assume by is an array.

Embodiments provide a new function mySystem.getCachedCopy. To obtain a cached copy of data object B, the caching system 112 calls function mySystem.getCachedCopy, which has the following syntax:

var A=mySystem.getCachedCopy(B, depth);

where data object A is the cached copy of data object B, and depth is optional and identifies a level of the data object hierarchy such that the root data object to the one or more child data objects at that level are cached.

If depth is not specified, the function recursively caches all child data objects of data object B. When depth is 0, no child data objects of data object B are cached. In certain embodiments, this is used when it is known that all properties are primitive values or no child objects will be changed. When depth is 1, the first level child data objects of data object B are cached, including any arrays.

Data object A refers to data object B as its prototype, and some properties and functions can be inserted under data object A. In certain embodiments, the caching system 112 inserts one property and one function under data object A. The property is "_origin_", which points to the original data object cached. The function is "submit", which is called back by the caching system 112 when the changes are submitted, if there are any.

The logic of submit function are outlined in the following pseudo code:

```
If (the original_data_object is an array and the length of the cached_copy
has changed) {
    original_data_object.length = cached_copy.length;
}
for (each property the cached_copy owns) {
    call submit on cached property;
    set change flag;
}
```

Figure 2:
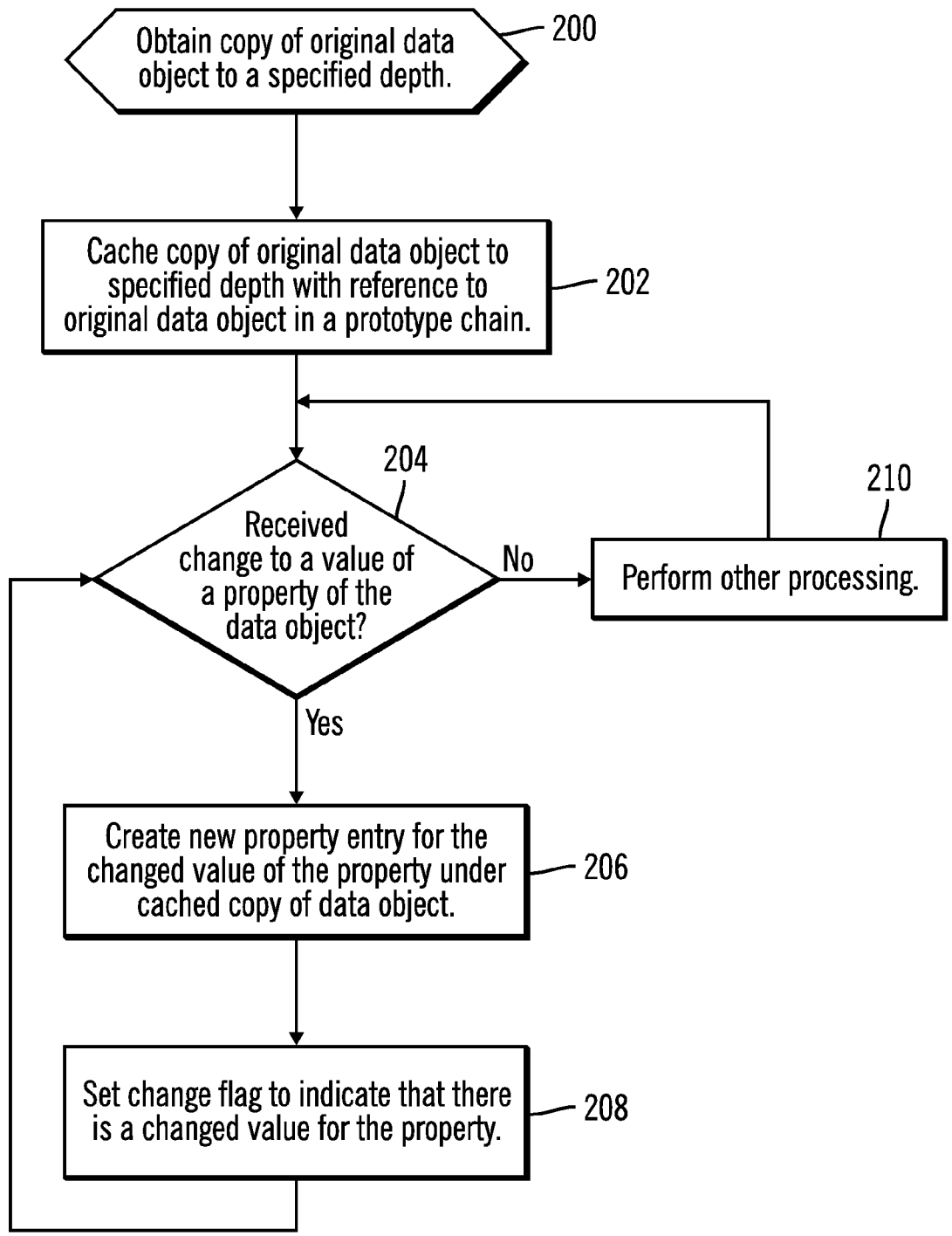
FIG. 2 illustrates, in a flow diagram, operations for caching changed values of properties of data objects in accordance with certain embodiments.

FIG. 2 illustrates, in a flow diagram, operations for caching changed values of properties of data objects in accordance with certain embodiments. Control begins at block 200 with the caching system 112 obtaining a copy of an original data object to a specified depth. In certain embodiments, the caching system 112 calls the function mySystem.getCachedCopy to obtain a copy of the original data object that is to be cached. In block 202, the caching system 112 caches the copy of the original data object with reference to the original data object in a prototype chain. In certain embodiments, cached copy initially points to the original data object without copying the data of the original data object. In block 204, the caching system 112 determines whether a change to a value of a property of the data object has been received. If so, processing continues to block 206, otherwise, processing continues to block 210.

In block 210, the caching system 112 performs other processing and then loops back to block 204.

In block 206, the caching system 112 creates a new property entry for the changed value of the property under the cached copy of the data object. In block 208, the caching system 112 sets a change flag to indicate that there is a changed value for the property. That is, the change flag is set to indicate that the value of the selected property of the cached data object is not the same as the value of the corresponding property of the original data object. From block 208, processing loops back to block 202.

Figure 3A:
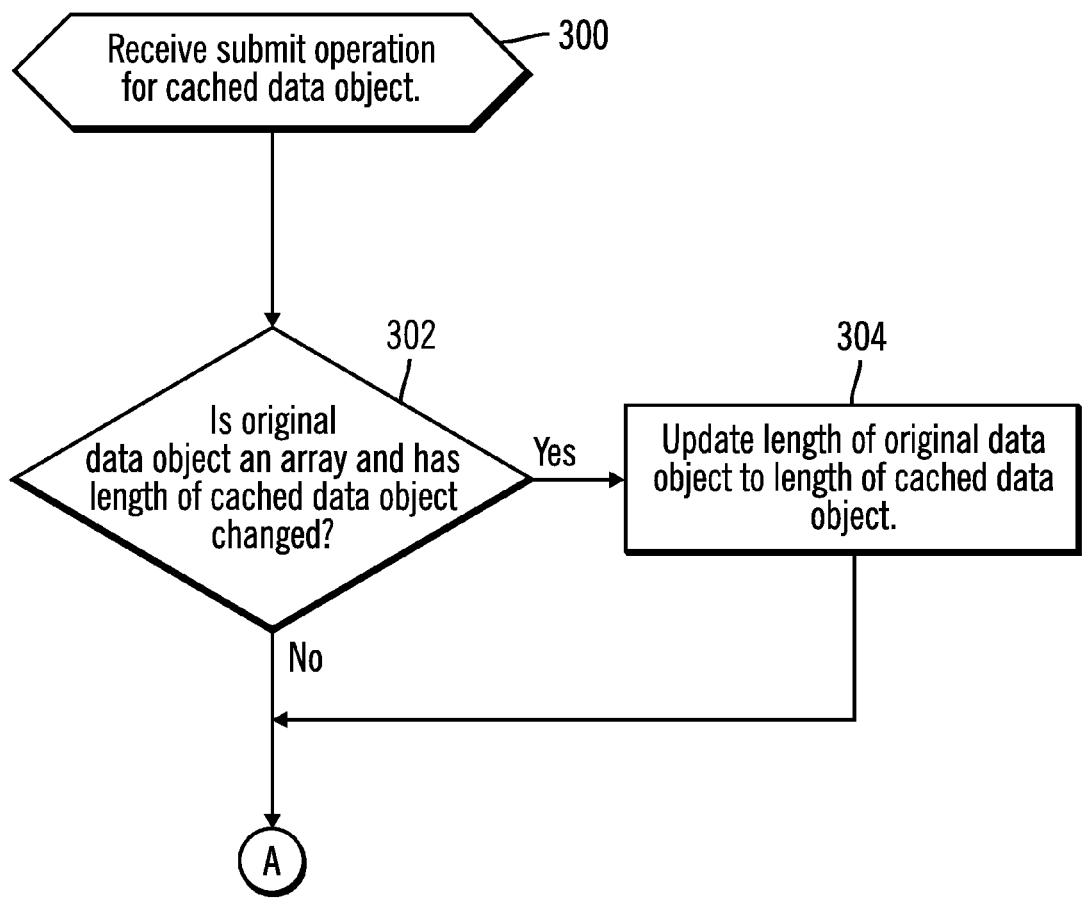
FIG. 3 illustrates, in a flow diagram, operations for submitting changed values of properties of data objects in accordance with certain embodiments.
Figure 3B:
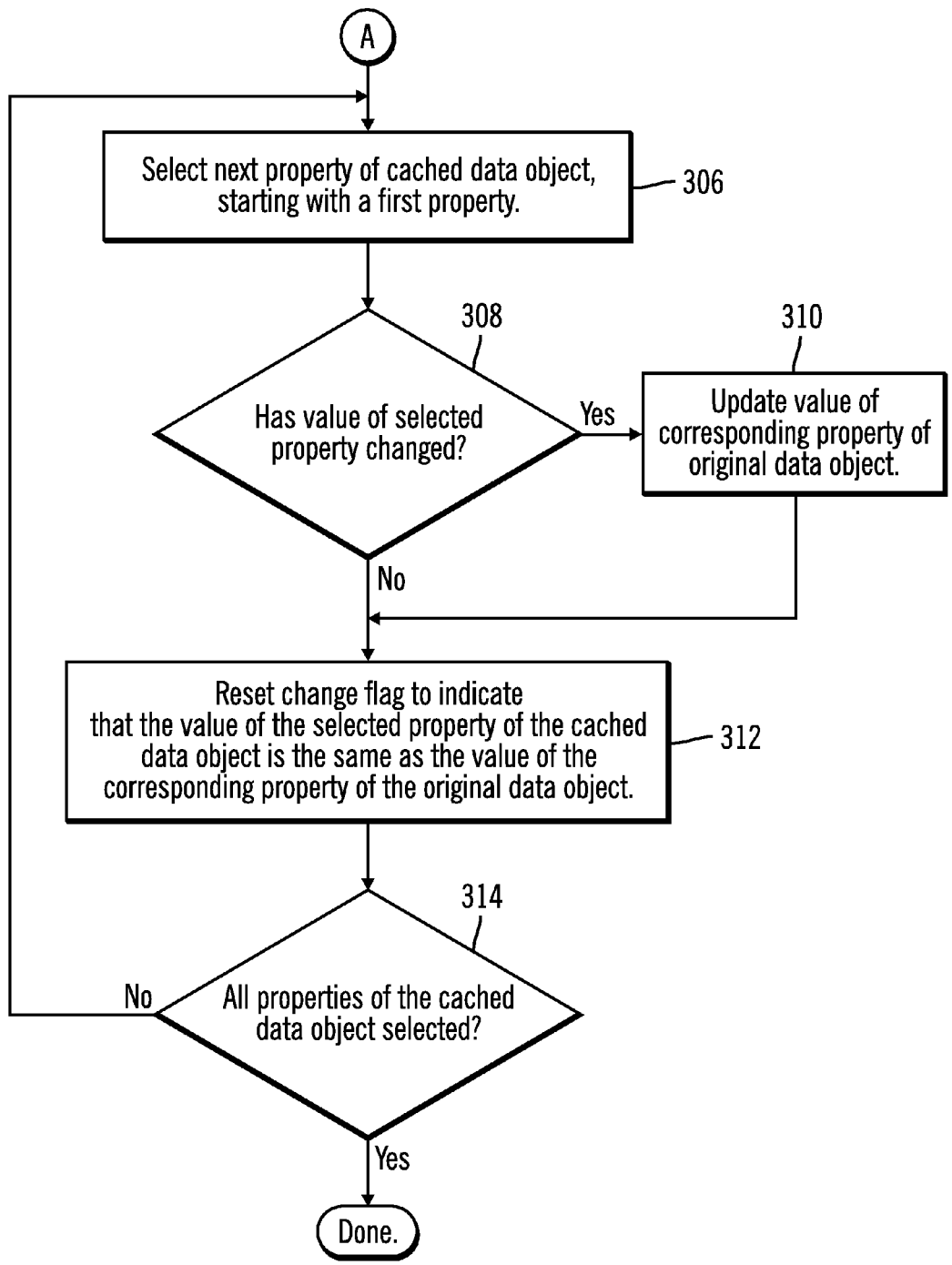

FIG. 3 illustrates, in a flow diagram, operations for submitting changed values of properties of data objects in accordance with certain embodiments. FIG. 3 is formed by FIGS. 3A and 3B.

Control begins at block 300 with the caching system 112 receiving a submit operation (e.g., from a user at the client computer 100 using the web browser 110) for the cached data object.

In block 302, the caching system 112 determines whether the original data object is an array and whether the length of the cached data object has changed. If so, processing continues to block 304, otherwise, processing continues to block 306 (FIG. 3A). In block 304, the caching system 112 updates the length of the original data object to the length of the cached data object. From block 304, processing continues to block 306 (FIG. 3A).

In block 306, the caching system 112 selects a next property of the cached data object, starting with a first property. That is, the cached data object may have properties and child data objects, which may have properties. So, the caching system 112 selects the cached data object and each of its child data objects, one at a time, for processing properties.

In block 308, the caching system 112 determines whether a value of the selected property has changed. If so, processing continues to block 310, otherwise, processing continues to block 312. In certain embodiments, the caching system 112 determines that the value of the selected property has changed if the change flag for that property is set to indicate that the value has changed.

In block 310, the caching system 112 updates the value of a corresponding property of the original data object. In certain embodiments, the caching system 112 calls a submit operation on the selected property. From block 310, processing continues to block 314.

In block 312, the caching system 112 resets the change flag to indicate that the value of the selected property of the cached data object is the same as the value of the corresponding property of the original data object.

In block 314, the caching system 112 determines whether all properties of the cached data object have been selected. If so, processing is done, otherwise, processing loops back to block 306 to select another property.

In certain embodiments, the caching system 112 provides a technique for caching data objects using prototype chaining for a web 2.0 application.

The caching system 112 does not require additional memory to hold a property if the value of that property does not change. Additional memory space is used when a change to a property value occurs, and the allocation of the addition memory space (or the new property entity) is automatically conducted by the caching system 112.

In an object-oriented programming environment (e.g., a JavaScript® programming environment) in which access to a property is only possible or restricted through the property's set function, it is possible to have a change flag set or reset when a change is done or undone on a property. The caching system 112 uses a change flag on a cached copy of a data object to avoid a recursive and time-consuming look-up process during change submission.

The caching system 112 allows parameters to be defined and employed in caching so that caching may be configured or done as it is required by the caller or the consumer of the caching mechanism. For example, a "depth" parameter may be passed to the caching system 112 to specify the depth of the hierarchy of data objects that are to be cached. Furthermore, the caching system 112 may interact with other sub-systems.

For example, upon a successful change submission, the caching system 112 is able to fire property change events to whoever has registered to these property change events.

The caching system 112 is generic in that the caching system 112 does not depend on a specific definition or on metadata of data objects that are to be cached. The caching system 112 uses prototype chains, but the caching system 112 does not depend on a specific data structure or on a property name or property type of cached data objects. Also, any change in object metadata does not compromise or affect the caching system 112.

Moreover, the caching system 112 can not only be used in a web browser-based environment, but also may be used in any object host or run-time environment in which a prototype-based language and/or ECMAScript-compatible programming language can be interpreted and executed. Thus, a web-browser herein may be considered a host for any JavaScript® objects (which comply with the ECMAScript standard).

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2 and 3 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 4:
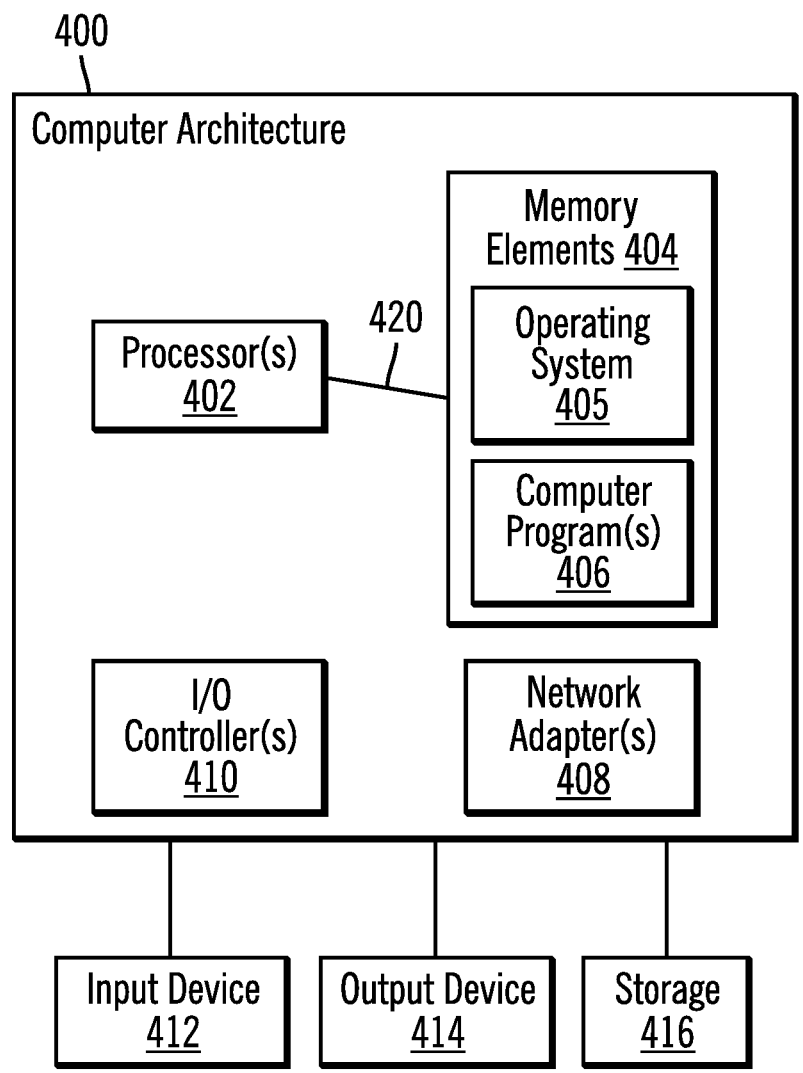
FIG. 4 illustrates, in a block diagram, a computer architecture that may be used in accordance with certain embodiments.

FIG. 4 illustrates a computer architecture 400 that may be used in accordance with certain embodiments. The client computer 100 and/or the web server 130 may implement computer architecture 400. The computer architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The computer architecture 400 may be coupled to storage 416 (e.g., any type of storage device; a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The computer architecture 400 may include fewer components than illustrated, additional components not illustrated herein, or some combination of the components illustrated and additional components. The computer architecture 400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for caching a data object, comprising:
   obtaining, with a processor of a computer, a copy of an original data object to a specified depth;
   caching the copy of the original data object to the specified depth with reference to the original data object in a prototype chain;
   receiving a change to a value of a property of the cached copy;
   creating a new property entry for the changed value of the property of the cached copy;
   setting a change flag to indicate that there is a changed value for the property;
   receiving a submit operation for the cached copy of the data object; and
   for the property of the cached copy,
      determining whether the value of the property has changed;
      in response to determining that the value of the property has changed,
         updating a value of a corresponding property of the original data object; and
         resetting the change flag to indicate that the value of the property of the cached copy is a same as the value of the corresponding property of the original data object.

2. The method of claim 1, wherein the determination of whether the value of the property has changed further comprises:
   checking the change flag.

3. The method of claim 1, further comprising:
   in response to determining that the original data object is an array and that a length of the cached copy has changed, updating a length of the original data object to the length of the cached copy.

4. The method of claim 1, wherein the cached copy points to the original data object without copying the data of the original data object.

5. The method of claim 1, wherein the depth identifies a level of a data object hierarchy of the original data object.

6. A computer system for caching a data object, comprising:
   a processor; and
   a storage device coupled to the processor, wherein the storage device has stored thereon a program, and wherein the processor is configured to execute instructions of the program to perform operations, wherein the operations comprise:
      obtaining a copy of an original data object to a specified depth;
      caching the copy of the original data object to the specified depth with reference to the original data object in a prototype chain;
      receiving a change to a value of a property of the cached copy;
      creating a new property entry for the changed value of the property of the cached copy;
      setting a change flag to indicate that there is a changed value for the property;
      receiving a submit operation for the cached copy of the data object; and
      for the property of the cached copy,
         determining whether the value of the property has changed;
         in response to determining that the value of the property has changed,
            updating a value of a corresponding property of the original data object; and
            resetting the change flag to indicate that the value of the property of the cached copy is a same as the value of the corresponding property of the original data object.

7. The computer system of claim 6, wherein the operations for determination of whether the value of the property has changed further comprise:
   checking the change flag.

8. The computer system of claim 6, wherein the operations further comprise:
   in response to determining that the original data object is an array and that a length of the cached copy has changed, updating a length of the original data object to the length of the cached copy.

9. The computer system of claim 6, wherein the cached copy points to the original data object without copying the data of the original data object.

10. The computer system of claim 6, wherein the depth identifies a level of a data object hierarchy of the original data object.

11. A computer program product for caching a data object, the computer program product comprising:
   a computer readable storage medium having computer readable program code embodied therein, the computer readable program code comprising:
   computer readable program code, when executed by a processor of a computer, configured to perform:
      obtaining a copy of an original data object to a specified depth;
      caching the copy of the original data object to the specified depth with reference to the original data object in a prototype chain;
      receiving a change to a value of a property of the cached copy;
      creating a new property entry for the changed value of the property of the cached copy;
      setting a change flag to indicate that there is a changed value for the property;
      receiving a submit operation for the cached copy of the data object; and
      for the property of the cached copy,
         determining whether the value of the property has changed;
         in response to determining that the value of the property has changed,
            updating a value of a corresponding property of the original data object; and resetting the change flag to indicate that the value of the property of the cached copy is a same as the value of the corresponding property of the original data object.

12. The computer program product of claim 11, wherein, for the determination of whether the value of the property has changed, the computer readable program code, when executed by the processor of the computer, is configured to perform checking the change flag.

13. The computer program product of claim 11, wherein the computer readable program code, when executed by the processor of the computer, is configured to perform:

in response to determining that the original data object is an array and that a length of the cached copy has changed, updating a length of the original data object to the length of the cached copy.

14. The computer program product of claim 11, wherein the cached copy points to the original data object without copying the data of the original data object.

15. The computer program product of claim 11, wherein the depth identifies a level of a data object hierarchy of the original data object.

* * * * *